Feb. 5, 1957 T. B. HUDSON, JR 2,780,285
SHEAR CONTROL MECHANISM
Filed Aug. 18, 1954

INVENTOR.
Thomas B. Hudson, Jr.
BY
HIS ATTORNEYS

United States Patent Office 2,780,285
Patented Feb. 5, 1957

2,780,285

SHEAR CONTROL MECHANISM

Thomas B. Hudson, Jr., Pittsburgh, Pa., assignor to Curry Air Shear Corporation, Pittsburgh, Pa., a corporation of Pennsylvania Application August 18, 1954, Serial No. 450,641

1 Claim. (Cl. 164—41)

This application relates to a shear control mechanism, which mechanism is primarily intended for the control of shears which must be actuated as quickly as possible after material to be cut is inserted in the shears.

There are many instances in which material to be cut by shears must be cut very quickly, even though the material is difficult to cut and the shear is correspondingly heavy. An example of this can be found in the hot rolling of steel bars, in which hot steel bars are passed through a succession of stands of rolls to reduce the bars to the final desired size. In such hot mills the steel is fed by hand into the bite of successive stands of rolls while the steel is moving at high speed, there being loopings between stands to give the roller a short period of time to take the bar from one stand and feed it into the next stand. Occasionally, the leading end of a steel bar, as it comes from one set of rolls and is about to be passed into another set of rolls, will be bent or split so that it cannot be passed into the next set of rolls. It is therefore necessary to cut off the bad portion of the leading end before it is inserted into a set of rolls, but in the meantime the steel bar is still coming out of the stand in advance of the stand into which the leading end is to be inserted and at a high rate of speed. Obviously, a shear having a mechanism which will actuate the shear as soon as the roller places the bar in the shear is highly desirable. It should also be kept in mind that the roller is holding the bar with a pair of tongs which require both of his hands to keep them closed.

I have invented simple effective control mechanism for a shear which actuates the shear as soon as the bar is placed into the jaws of the shear for cutting. I provide as part of my control mechanism a lever which lies in the path of movement of the bar when it is placed in the shear to be cut. Placing the bar in cutting position moves the lever, and the motion of the lever, in turn, actuates the control for whatever source of power is used to close the jaws of the shear.

In the accompanying drawings, I have illustrated a present preferred embodiment of my invention in which.

In the accompanying drawings, I have illustrated my control mechanism as applied to a shear having a cylinder and piston driven by compressed air which close the jaws of the shear to make a cut. However, my control mechanism can be used to actuate shears which are driven by other sources of power.

Figure 2:
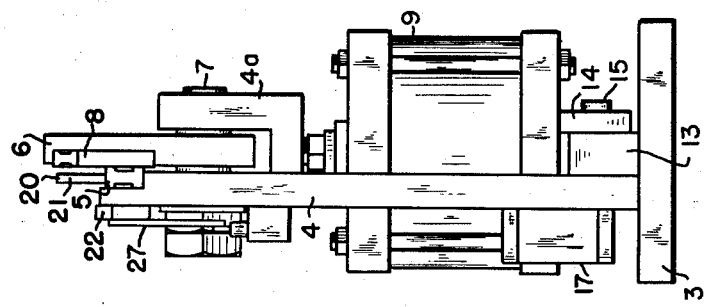
Figure 2 is an end view of the shear shown in Figure 1.
Figure 1:
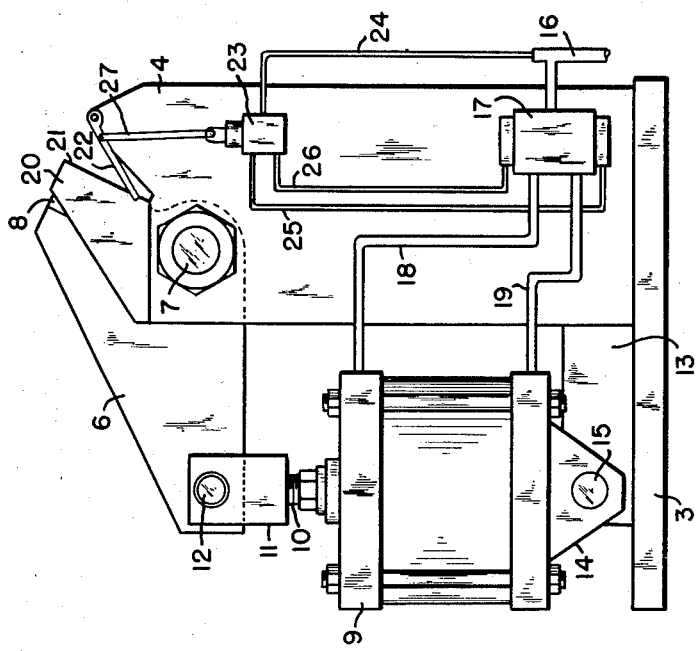
Figure 1 is a side elevation of a shear having my control mechanism.

Referring to Figure 1 of the drawings, the shear there shown has a base 3 and an upright plate 4 which carries a fixed knife 5 and forms one of the jaws of the shear. A lever 6 pivotally mounted on a king pin 7 adjacent the upper end of the plate 4 carries a knife 8 and is the movable jaw of the shear. The plate 4 and a bracket 4a extending from the plate support the king pin 7.

The lever 6 is turned about the king pin 7 by a cylinder 9 and piston, only the rod 10 of which appears in the drawings, the piston rod 10 being pivotally secured to the lever 6 adjacent one end of the lever by a clevis 11 and pin 12. A vertical bracket 13 extending up from the center of the base 3 and a bracket 14 extending down from the base of the cylinder 9 support the cylinder by a pin 15 which passes through both brackets.

A pipe 16 leading from a source of compressed air connects to a conventional control valve 17, from which pipes 18 and 19 lead to the top and bottom, respectively, of the cylinder 9. The valve 17 controls the flow of compressed air to the bottom or top of the cylinder 9 so as to raise or lower the piston within the cylinder and thereby raise and lower the knife 8 past the knife 5.

At the top of the plate 4, I provide a holddown 20 which is in the form of a narrow plate having an edge 21 which slopes outwardly over the knife 5 and thereby prevents the bar from rising away from the knife 5 when the knife 8 is moved downwardly past the knife 5 to cut the bar.

A lever 22 is pivotally mounted to the plate 4 at the upper end of the plate and above the level of the fixed knife 5 and on the side of the plate 4 which is opposite to the side on which the knife 5 is mounted.

As is shown in Figure 1, the lever 22 extends from its pivot point across the opening between the edge 21 of the holddown 20 and the upper edge of the fixed knife 5. When a bar is placed in the shear for cutting, it is placed under and against the edge 21 of the holddown and against the upper edge of the knife 5. When this is done, it strikes the lever 22 and moves it about its pivot point.

I also provide a conventional pilot valve 23 which is supplied by compressed air from the pipe 16 by a pipe 24 and which has two pipes 25 and 26 connecting it to the control valve 17. Also, as appears in Figure 1, the lever 22 is connected to the pilot valve 23 by a second lever 27 so that when a bar is placed in the shear for cutting and moves the lever 22, the lever 22 actuates the pilot valve 23. The valve 23, in turn, actuates the control valve 17. The control valve permits the flow of fluid into the cylinder 9 through the pipe 19 to pivot the lever 6 and bring the knife 8 down past the knife 5 and thereby cut the material. When the bar is removed from the shear, the pilot valve 23 raises the lever 22 to the position shown in Figure 1 and actuates the control valve 17 to supply air to the top of the cylinder 9 through the pipe 18 and thereby open the shear.

From the foregoing it is apparent that I have invented a simple but effective and fast-acting control mechanism for shears. The mechanism is actuated simply by placing material to be cut in the jaws of the shear. The operator does not have to use one of his hands or one of his feet to move some sort of control for actuating the shears.

While I have described a present preferred embodiment of my invention, it is to be understood that it may be otherwise embodied within the scope of the appended claim.

I claim:

A control mechanism for a shear having a fixed cutting jaw, a movable cutting jaw, said jaws forming a V-shaped opening between them, a holddown forming with the fixed jaw a V-shaped opening spaced laterally of the opening formed by the jaws for receiving an elongated piece of indeterminate length to be cut at any desired length and power means for closing the jaws, said control mechanism comprising a lever pivoted adjacent the open end of the V-shaped opening between said fixed jaw and said holddown and extending across the opening and towards the apex of said opening, said lever also being positioned laterally of said opening whereby the piece to be cut can be placed in said openings at any desired point along its length and engage said lever and means connected to said lever and operated by movement of the lever to actuate said power means to close said jaws, said lever being moved when a piece to be cut is placed between the holddown and the fixed jaw.

References Cited in the file of this patent

UNITED STATES PATENTS

| | | |
|---|---|---|
| 1,986,352 | Moulton | Jan. 1, 1935 |
| 2,211,319 | Camerata | Aug. 13, 1940 |
| 2,503,994 | Bottas | Apr. 11, 1950 |
| 2,601,898 | Vestorsky | July 1, 1952 |
| 2,672,930 | Iffland | Mar. 23, 1954 |